Figure 1:
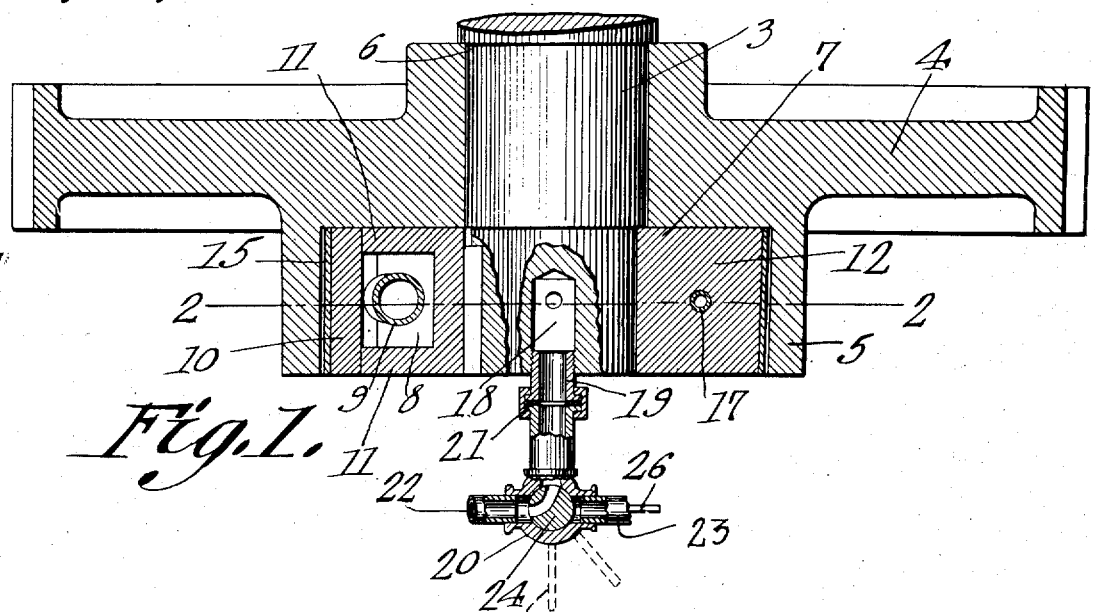

W. H. SEARS.
FRICTION CLUTCH.
APPLICATION FILED MAR. 20, 1914.

1,148,998. Patented Aug. 3, 1915.

W. H. Sears

Witnesses
Inventor
by C. A. Snow & Co.
Attorneys.

UNITED STATES PATENT OFFICE.

WELLINGTON H. SEARS, OF ANSONIA, CONNECTICUT.

FRICTION-CLUTCH.

1,148,998.

Specification of Letters Patent.

Patented Aug. 3, 1915.

Application filed March 20, 1914. Serial No. 826,081.

*To all whom it may concern:*

Be it known that I, WELLINGTON H. SEARS, a citizen of the United States, residing at Ansonia, in the county of New Haven and State of Connecticut, have invented a new and useful Friction-Clutch, of which the following is a specification.

This invention relates to improvements in friction clutches and more particularly to that class which are pressure operated.

The object of the present invention is to provide a friction clutch which will be simple in construction, will embody few parts and which parts are placed well toward the center of the clutch to therefore provide a clutch having a small amount of inertia.

A further object is to provide a pressure operated friction clutch including a pair of tangentially disposed cylinders and with the piston rod inclined at an angle to the tangent at the point of application of the clutch substantially equal to 45 degrees, thus providing for the local application of the clutch member and for the general expansion as well.

A further object is to provide a pressure operated friction clutch with a threeway valve such that the pressure operated mechanism of the clutch may be brought into communication with the pressure supply, the outlet or pressure discharge, and an intermediate position therebetween in which it is closed with respect to the pressure inlet and discharge pipes.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is disclosed, in which:—

Figure 2:
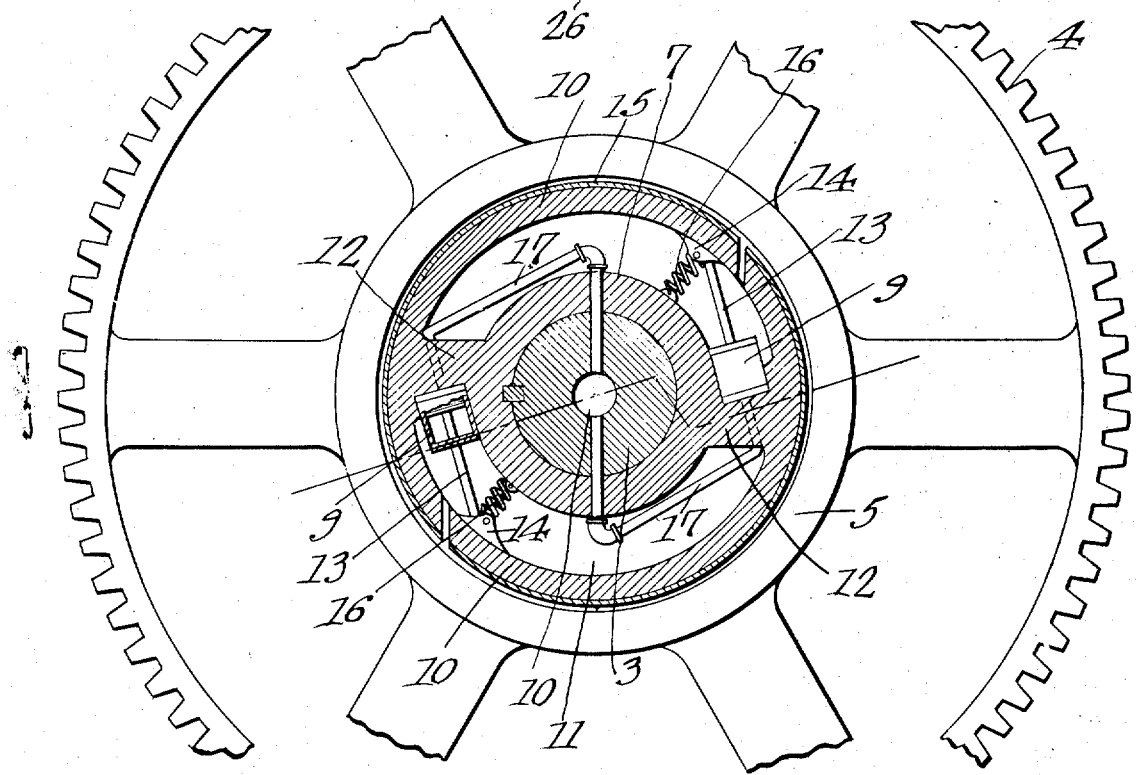

Figure 1 is a side view in section of my improved clutch. Fig. 2 is a front view in elevation thereof, taken on the line 2—2 of Fig. 1.

Referring to the drawings in which similar reference numerals designate corresponding parts throughout the several views, 3 is a shaft upon which is idly mounted the gear 4. Said gear is provided with the outstanding annular hub 5 with the internal surface of which the internally expanding friction clutch is designed to engage. The shaft is provided with the shoulder 6 which prevents the longitudinal shifting of the gear in one direction and the sleeve 7 which is keyedly secured to the extremity of the shaft prevents the shifting in the opposite direction.

Power is transmitted to the gear 4 and in order that the shaft 3 may be operated thereby, the sleeve 7 is provided with two grooves or channels 8, in which are located the pressure cylinders 9. The said cylinders are arranged upon opposite sides of the sleeve. Internally expanding curved arms 10 are formed integral with or rigidly secured to the sleeve 7 and which with the upstanding end walls 11 define the annular groove 8 mentioned. The said arms, of which there are two, are secured at their one extremity or formed integral with the outstanding bosses 12 and are formed of such material as to be internally expanded into contact with the interior surface of the hub 5. The cylinders are provided with the piston rods 13 which engage the adjacent extremities of the free ends of the arms 10. The said arms are provided with the outstanding plates 14 by means of which the piston rods are pivotally secured thereto. The arms 10 are provided with a suitable facing or lining 15 so that the proper and required amount of friction will be experienced between the arms and the gear hub. Suitable tension springs 16 are provided engaging the sleeve 7 and the free extremities of the arms and normally hold the said arms out of contact with the hub, thus allowing the free rotation of the gear with respect to the shaft.

The piston rods 13 extend at an angle of substantially 45 degrees to a radial through the extremity of the piston rod. This provides that the force exerted along the piston rod will produce two substantially equal components along a radial line, and along a tangential line, the radially extending component providing for the local application of the clutching arm, while the tangential component provides for the general expansion and application thereof.

Suitable ducts or pipes 17 communicate with the cylinders and with the central bore 18 with which the shaft 3 is provided. A pipe 19 communicates with the said bore and with a stationary throttle valve 20 by means of the packing joint 21. The throttle valve 20 is provided with the inlet pressure supplying pipe 22 and the outlet and exhaust pipe 23 communicating therewith. The valve member 24 is provided with a limited and curved duct leading therethrough, by means of which the cylinders may be brought into communication with either the inlet or outlet pipes or may be closed therefrom. A throttle handle 26 is provided, for the suitable manipulation of the valve and thus controls the application of the friction members. The pressure supply in the pipe 22 is sufficient to lock the gear rigidly to the shaft and by suitable manipulation of the throttle any intermediate result may be obtained from the idle mounting of the gear upon the shaft to the locked position thereof. It will be understood that the pressure supply pipe 22 communicates with a pump and the pressure operating medium may be in the nature of a liquid such as oil, or it may be a gas, such as steam or air. The medium used will depend largely upon the use to which the clutch is to be applied, it being noted that if it is required that the gear is designed to slip somewhat upon the shaft, a gaseous medium will be used, due to its elasticity and the fact that it is more readily controlled so that intermediate pressures may be applied to the cylinders. If, however, it is required that a locking action take place which may be instantly released, the liquid medium will be found more serviceable.

It is to be understood that the number of cylinders 9 and clutch members may be varied according to the power the apparatus is designed to transmit.

Having thus fully described my invention, what I claim is:—

1. An apparatus of the class described, comprising a shaft, a wheel idly mounted thereon, means for preventing the longitudinal shifting of the wheel with respect to the shaft, a sleeve member rigidly secured to the said shaft, resilient arms carried by said sleeve, said wheel provided with an outlying hub housing the arms therein, an actuating member connected to each arm and mounted for right line movement in the wheel, and means for directing fluid under pressure against said members to expand the arms into frictional contact with the hub.

2. An apparatus of the class described, comprising a wheel slidably mounted on a shaft, said wheel provided with an outstanding hub with an internal frictional engageable surface, a sleeve rigidly mounted upon said shaft and actuated thereby, said sleeve provided with an annular groove, expansion arms carried by said sleeve adapted to come into forcible contact with the frictional engageable surface of said wheel hub, oppositely disposed cylinders carried by said sleeve and located within said groove, pistons disposed within said cylinders and engaging the free extremities of said arms and defining an angle of substantially 45 degrees to the radial through the point of connection therebetween, resilient means adapted to normally hold said arms out of contact with the said wheel hub, and means for supplying pressure to said cylinders for the expansion of said arms.

3. An apparatus of the class described, comprising a rotatable supporting member, a member mounted idly thereon, a sleeve member rigidly secured to the supporting member, a member carried by said sleeve and adapted to expand into contact with the idly mounted member, an operating member engaging said expansible member and arranged for right line movement within the wheel at an angle of substantially 45 degrees with respect to a radial through the point of application of the force, and means for directing fluid under pressure against said operating member to actuate it.

In testimony that I claim the foregoing as my own, I have hereto affixed my signature in the presence of two witnesses.

WELLINGTON H. SEARS.

Witnesses:
LAWRENCE K. BLACKMAN,
ARTHUR J. HOWE.